May 15, 1956     C. K. STUDLEY, JR     2,745,447
ANGULARLY AND LINEARLY ADJUSTABLE STOCK GUIDE
Filed Sept. 1, 1953     2 Sheets-Sheet 1

INVENTOR.
Clarence K. Studley Jr.
BY
PATENT AGENT

May 15, 1956  C. K. STUDLEY, JR  2,745,447
ANGULARLY AND LINEARLY ADJUSTABLE STOCK GUIDE
Filed Sept. 1, 1953  2 Sheets-Sheet 2
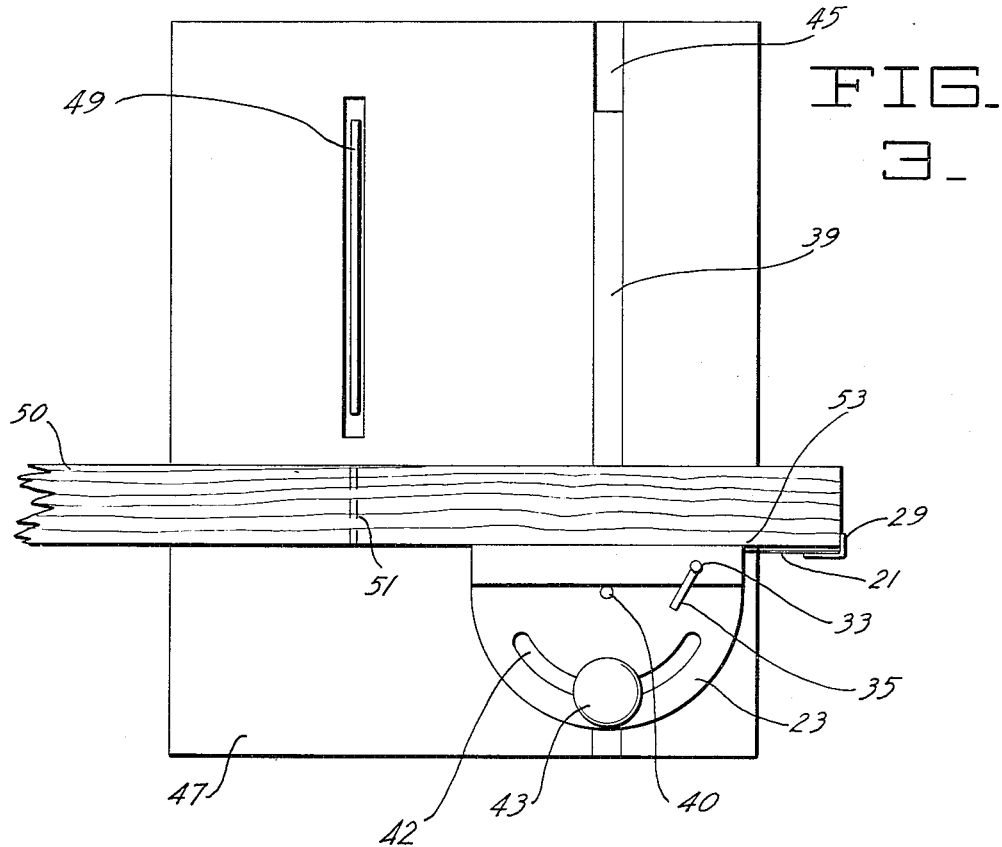
FIG. 3.
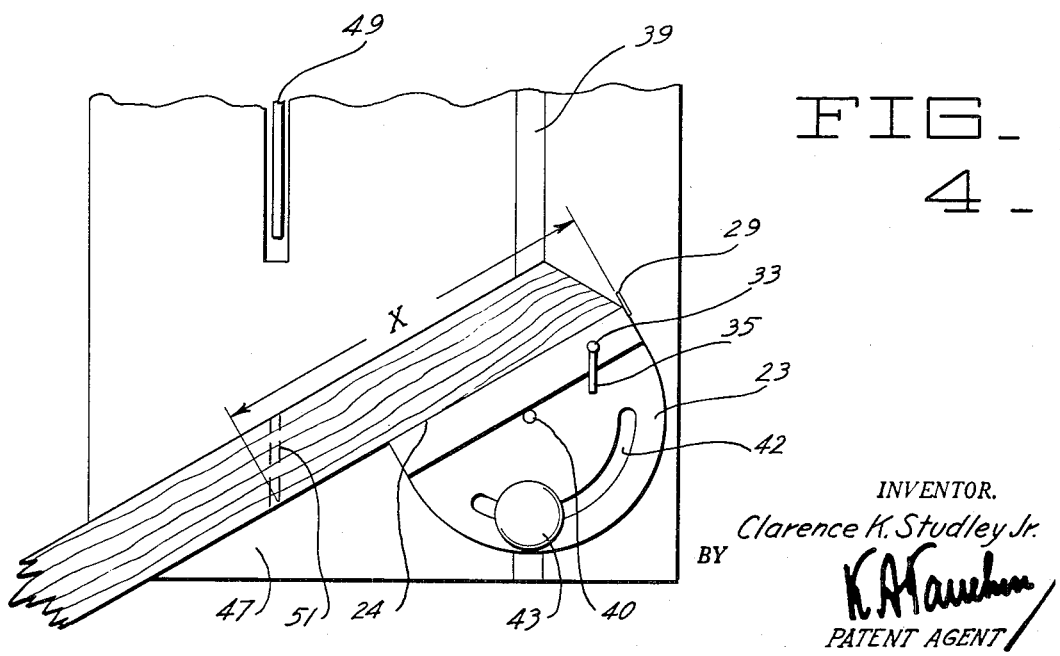
FIG. 4.
INVENTOR.
Clarence K. Studley Jr.
BY
PATENT AGENT

United States Patent Office 2,745,447
Patented May 15, 1956

2,745,447

ANGULARLY AND LINEARLY ADJUSTABLE STOCK GUIDE

Clarence K. Studley, Jr., Berkeley, Calif.

Application September 1, 1953, Serial No. 377,763

2 Claims. (Cl. 143—169)

This invention relates to cutting machinery, such as power saws, in which a stock guide controls the angle of cut and a dimension of the piece to be cut from the stock. The invention is particularly concerned with an improved manner of presetting and controlling the distance from a predetermined point on the stock to the location of the cut.

It is an object of this invention to provide, for cutting machinery of the type referred to, an improved settable stock guide for controlling the dimension of the piece to be cut from the stock.

It is another object of the invention to provide a stock guide, of the type referred to, with an adjustable stop element against which the stock may be brought to adjust the length of the cut to a predetermined dimension.

It is yet another object of this invention to provide an improved settable stock guide, of the type referred to, which will present a direct reading of the dimension from the stop element to the point of cutting.

It is a further object of this invention to furnish an improved settable stock guide, of the type referred to, which will provide a direct reading of the dimension from the stop element to the point of cutting for a variety of different angles to which the guide may be set.

It is yet another object of this invention to provide an improved settable stop arrangement for a movable stock guide, which can be completely contained within the stock guide, and need not be removed therefrom regardless of the operation being performed.

It is an additional object of this invention to provide a settable stop arrangement for controlling the length of a piece to be cut from the stock which may conveniently be used for much greater dimensions than was possible with previous types of stops.

Furthermore, it is an object of this invention to provide an improved settable stop arrangement for a movable stock guide which can quickly be set to control a cut and then can be quickly returned to an inoperative position wherein it is completely out of the way, and will not interfere with any other operations which may require the use of the stock guide.

These and other objects of my invention will appear more clearly from the following specification in connection with the accompanying drawings in which:

Fig. 3 is a plan view of a power saw with the stock guide of the invention mounted thereon and set for a 90° cut; and Fig. 4 is a fragmentary plan view of the power saw shown in Fig. 3 with the stock guide set at a different angle.

Figure 1:
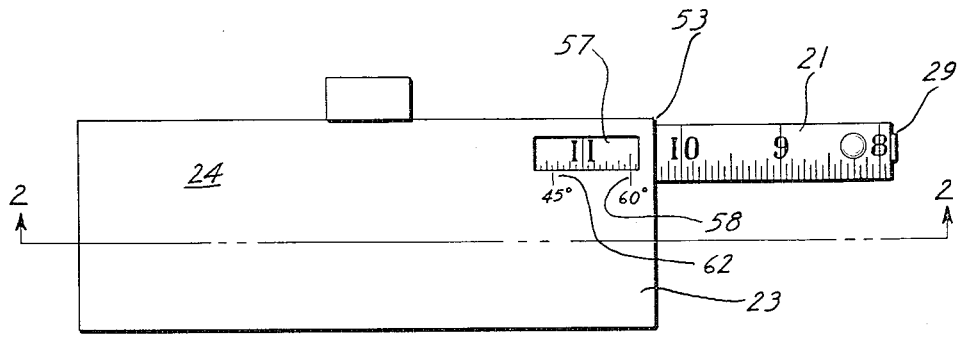
Fig. 1 is a view of the forward face of a stock guide embodying the invention.

In the accompanying drawings the instrument is illustrated as applied to a power driven circular saw. In said drawings the reference numeral 21 designates a steel tape of the coil type similar to the common measuring tape used by carpenters, and 23 is the body of the stock guide which is of semi-circular shape forming a flat front face 24. 25 is a cavity in said body wherein the tape coil is stored. 27 is a slot in the stock guide body 23 through which the steel tape passes from the storage cavity to present a hook 29 to the operator which he engages with the end of the stock. 31 is a locking cam mounted at the lower end of a vertical shaft 33. The upper end of the shaft 33 extends above the top of the stock guide body and carries a manipulating handle 35 (Figs. 3 and 4). When it is desired to lock the tape in a given position for repetitive operations, a slight counterclockwise rotation of shaft 33 by means of the handle 35 will cause the cam 31 to press a locking reed 37 against the tape as it passes through the slot 27.

Figure 2:
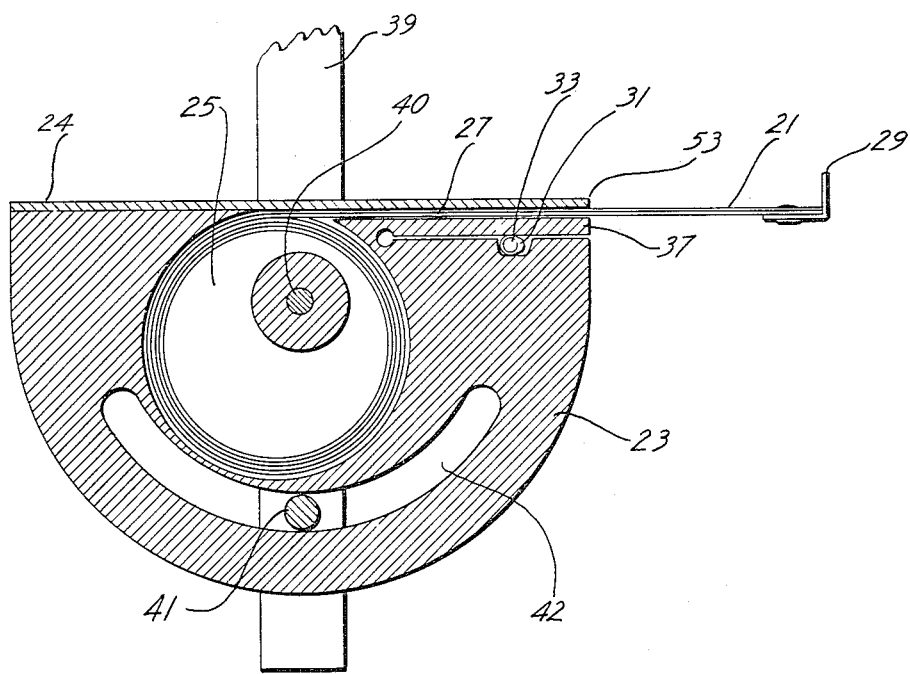
Fig. 2 is a section through the stock guide taken along the line 2—2 of Fig. 1 and viewed in the direction of the arrows associated with said line.

As shown in Figs. 2 and 3 the stock guide body 23 is secured to a slide 39 by a pivot 40, and a stud 41 projecting upwardly from slide 39 engages an arcuate slot 42 provided in the body of the stock guide and carries upon its upwardly projecting threaded end an internally threaded locking nut 43. When it is desired to make a cut at an angle other than 90°, the locking nut 43 is unscrewed partially, and the stock guide body is rotated upon pivot 40 to the desired angle, whereupon the nut 43 is again tightened on the stud 42.

In Fig. 3 the stock guide of the invention is shown mounted on the table 47 of a power saw and adjusted for making right angle cuts. The slide 39 which carries the stock guide body is mounted in a slot 45 provided in the surface of the table 47. The slot 45 extends at a fixed distance parallel to the cutting blade 49 of the power saw. Therefore, the cutting performed by the blade will have a fixed relationship to the stock guide body as it slides along the table of the saw.

By selecting a stationary point on the body of the stock guide relative to the tape 21, such as the right edge 53 of the front face 24 of the stock guide (Figs. 1, 2 and 3) and by appropriate calibration of the tape relative to said point, which is referred to as the witness mark hereinafter, it is possible to indicate at a glance the length of the piece to be cut from the stock for every setting of the tape hook; in other words, if a piece one foot long is to be cut from the stock, the tape is withdrawn from the body of the guide until its calibration indicates, opposite the witness mark, the value of one foot. When the stop element is so adjusted, the distance from the hook to the plane of the cutting blade is one foot, and a piece of this length will be cut from the stock if the stock lies flat against the front face 24 of the guide and its end engages the hook 29 during the cutting operation. Whenever the hooked end 29 of the tape is withdrawn further from the body of the stock guide, consecutively higher calibration marks moving into alignment with the witness mark will indicate the distance between the hooked end of the tape and the near flank of the saw blade. In the particular embodiment of the invention illustrated in the accompanying drawings wherein the witness mark is formed by the right edge of the front face 24 of the guide, the calibration mark on the tape adjacent the hook must indicate the distance between the right side edge of the front face and the near flank of the saw blade 49. This distance is the shortest length of a piece that can be cut from a stock with the help of the stock guide of the invention, which piece may be measured by engaging the hook 29 over one end of the stock with the tape 21 fully returned into the body of the guide. From the hook 29 the value of the calibrations on the tape must ascend as illustrated in Fig. 1 to indicate longer dimensions as the tape is withdrawn from the stock guide.

Having once established a scale on the tape and a witness mark for use when the stock guide body is set for 90° as described above, it is a simple matter to establish a witness mark for any other angle merely by setting the stock guide body to the desired angle, for example 60° as shown in Fig. 4, adjust the tape to its fully retracted position, and measure the distance (X) along the face 24 of the stock guide from the hook 29 to the plane 51 determined by the near flank of the saw. Having ascertained said distance, it is only necessary to establish a witness mark on the face of the stock guide adjacent the point on the tape where the proper calibration appears.

In the exemplary embodiment of the invention illustrated in Fig. 4, the witness mark for an angle of 60° would come within the body of the guide. Therefore, a window 57 is provided in the front face 24 of the guide body through which the rectilinear run of the tape within the guide body is visible. Adjacent the edge of said window the witness mark 58 for operating at an angle of 60° is scribed in the front face of the guide body (Fig. 1). Similarly it is readily possible to establish the witness mark 62 for operating at an angle of 45°, which lies to the left of the witness mark for operation at an angle of 60° as shown in Fig. 1. It will be understood that by the described method of marking the stock guide of the invention for operation at different angles, it is readily possible to establish the proper witness marks for any desired angle of operation.

While I have explained my invention with the aid of a preferred embodiment thereof, it is to be understood that I do not wish to be limited to the specific constructional details shown and described which may be departed from without departing from the spirit and scope of my invention.

Having thus described my invention, what I claim is:

1. A stock guide for circular saws and like cutting mechanisms for predetermining the length of a piece cut from the stock, comprising a slide arranged for movement in a direction parallel to the plane of the saw blade a predetermined distance therefrom, a block rotatably mounted upon said slide, and having a rectilinear stock guiding face, means for securing said block upon said slide in selected angular positions of said face relative to the plane of the saw blade, a cavity provided in said block behind said stock guiding face, a calibrated tape coil disposed within said cavity and having a run extending directly behind and parallel to the rectilinear face of said block and emerging from said block adjacent the edge of said face remote from the plane of the saw blade, a stock engaging hook provided at the end of said tape exteriorly of said block, the value of the calibrations of said tape being arranged to ascend in a direction inwardly from said hook, a window provided in the stock guiding face of said block to expose the parallel run of said tape within said block, and witness marks provided along said face adjacent calibrations on said tape, indicative of the distance between the said hook and the plane of the saw for different angular positions of said block relative to said plane when said tape is in fully retracted position.

2. A stock guide for circular saws and the like cutting mechanisms for predetermining the length of a piece cut from the stock, comprising a slide arranged for movement in a direction parallel to the plane of the saw blade a predetermined distance therefrom, a block rotatably mounted upon said slide, and having a rectilinear stock guiding face, means for securing said block upon said slide in selected angular positions of said rectilinear face relative to the plane of the saw blade, a cavity provided in said block behind said rectilinear face, a calibrated tape coil disposed within said cavity and having a run extending directly behind and parallel to the rectilinear face of said block and emerging from said block adjacent the edge of said rectilinear face remote from the plane of the saw blade, a stock engaging hook provided at the end of said tape exteriorly of said block, the value of the calibrations of said tape being arranged to ascend in a direction away from said hook, starting with a calibration indicative of the distance between the hook and the plane of the saw blade when the tape is fully retracted with said hook thereof bearing against the edge of said stock guiding face remote from the plane of the saw blade and said block being in a rotary position on said slide wherein its stock guiding face extends in a direction normal to the plane of the saw blade, a window provided in the stock guiding face of said block to expose the parallel run of said tape within said block, and witness marks provided along said face adjacent calibrations on said tape, indicative of the distance between the said hook and the plane of the saw at different angular positions of said block relative to said plane when said tape is in fully retracted position.

References Cited in the file of this patent

UNITED STATES PATENTS

| | | |
|---|---|---|
| 1,986,551 | Anderson | Jan. 1, 1935 |
| 2,010,882 | Ocenasek | Aug. 13, 1935 |
| 2,076,704 | Carlson | Apr. 13, 1937 |
| 2,237,556 | Hedgpeth | Apr. 8, 1941 |
| 2,571,569 | Greenwood | Oct. 16, 1951 |
| 2,667,190 | Delano | Jan. 26, 1954 |